US008085721B2

(12) United States Patent
Ylitalo

(10) Patent No.: US 8,085,721 B2
(45) Date of Patent: Dec. 27, 2011

(54) ADAPTIVE TRANSMISSION METHOD AND A BASE STATION USING THE METHOD

(75) Inventor: Juha Ylitalo, Oulu (FI)

(73) Assignee: Elektrobit Wireless Communications Oy, Oulu (FI)

( * ) Notice: Subject to any disclaimer, the term of this patent is extended or adjusted under 35 U.S.C. 154(b) by 961 days.

(21) Appl. No.: 12/045,041

(22) Filed: Mar. 10, 2008

(65) Prior Publication Data

US 2009/0227249 A1    Sep. 10, 2009

(51) Int. Cl.
*H04Q 7/00* (2006.01)
*G01S 3/02* (2006.01)
*H04B 7/08* (2006.01)

(52) U.S. Cl. ......... 370/329; 370/208; 342/457; 455/132
(58) Field of Classification Search .................. None
See application file for complete search history.

(56) References Cited

U.S. PATENT DOCUMENTS

| | | | | | |
|---|---|---|---|---|---|
| 5,596,333 | A | * | 1/1997 | Bruckert | 342/457 |
| 6,862,271 | B2 | * | 3/2005 | Medvedev et al. | 370/329 |
| 7,403,748 | B1 | * | 7/2008 | Keskitalo et al. | 455/101 |
| 7,574,236 | B1 | * | 8/2009 | Mansour | 455/562.1 |
| 7,957,486 | B2 | * | 6/2011 | Petrus et al. | 375/295 |
| 2003/0161282 | A1 | | 8/2003 | Medvedev et al. | |
| 2003/0228857 | A1 | * | 12/2003 | Maeki | 455/278.1 |
| 2005/0221837 | A1 | * | 10/2005 | Cha et al. | 455/452.2 |
| 2006/0120395 | A1 | * | 6/2006 | Xing et al. | 370/431 |
| 2008/0080634 | A1 | * | 4/2008 | Kotecha et al. | 375/267 |
| 2008/0080863 | A1 | * | 4/2008 | Sauer et al. | 398/70 |
| 2008/0130512 | A1 | * | 6/2008 | Park et al. | 370/252 |
| 2008/0159203 | A1 | * | 7/2008 | Choi et al. | 370/328 |
| 2008/0219373 | A1 | * | 9/2008 | Zhang et al. | 375/262 |
| 2009/0316802 | A1 | * | 12/2009 | Tong et al. | 375/260 |

FOREIGN PATENT DOCUMENTS

EP 1879317 A1 1/2008
WO 2004015887 A1 12/2004

OTHER PUBLICATIONS

European Search Report in corresponding PCT/EP2009/052771 dated Oct. 14, 2009.
Written Opinion of International Search Authority based on Application No. PCT/EP2009/052771.

* cited by examiner

*Primary Examiner* — Steven H Nguyen
(74) *Attorney, Agent, or Firm* — Young & Thompson

(57) ABSTRACT

The invention relates to a method, a base station and a computer program for selecting a spatial transmission method for a next downlink transmission in a base station. The base station can be a WiMAX, a UMTS or a 3 GPP LTE base station. According to the invention the base station makes a selection between beamforming (BF), space-time coding (STC) or MIMO for a next downlink frame. The selection is based on uplink measurements and feedback information from a particular mobile station whereto the next downlink frame is to be transmitted.

21 Claims, 3 Drawing Sheets

ADAPTIVE TRANSMISSION METHOD AND A BASE STATION USING THE METHOD

TECHNICAL FIELD OF THE INVENTION

The invention relates to a method for switching downlink transmission mode of a base station between beamforming (BF), space-time coding (STC) and MIMO (Multiple Input Multiple Output) according to measured uplink channel characteristics. The invention relates also to a base station where the switching method is utilized. Also the invention relates to a computer program which is utilized for fulfilling required process steps in a base station.

BACKGROUND OF THE INVENTION

Central problems in wireless communications are for example: how to improve the spectral efficiency, how to improve the system throughput, how to improve the link budget, how to reduce the required transmission power, how to reduce the interference in the system and how to select for one connection a proper momentary transmission mode from several possible transmission modes.

Most commonly used solutions to above-mentioned problems are sectorisation, beamforming (BF), different kind of diversity methods, multi-antenna techniques such as MIMO and adaptive radio link techniques. For example in WiMAX (Worldwide Interoperability for Microwave Access) and UMTS/LTE (Universal Mobile Telecommunications Services/Long Term Evolution) future roadmaps include multi-antenna techniques which apply extensively feedback from the mobile terminal in the so-called preceding approach for improving the radio link performance. In the preceding approach it is possible to combine beamforming and MIMO. The proposed system operates in a following way. The receiving mobile terminal estimates a down link radio channel (DL) and based on that information the mobile terminal directs a serving base station (BS) to apply different beamforming weights to the signals of different antennas. These techniques are still in a research mode and address to the WiMAX AAS/AMC (Adaptive Antenna Systems/Adaptive Modulation and Coding) modes which are not yet fully implemented in the WiMAX standards. The future AAS /AMC techniques increase complexity of the mobile terminal.

However, the basic commercial WiMAX mobile terminals do not support the advanced beam-forming and MIMO techniques. Therefore, there exists a need for a method by which a prior art WiMAX base station could select the most suitable transmission mode for each downlink transmission momentarily to a prior art WiMAX mobile station. The same problem is encountered with UMTS and 3GPP LTE base stations.

SUMMARY OF THE INVENTION

An aspect of the present invention is to provide a method, a base station and a computer program product for aiding proper momentary down link transmission mode selection in a base station of a cellular telecommunication network.

The objects of the present invention are fulfilled by providing a method for selecting a downlink frame spatial transmission mode from a multi-antenna base station to a mobile terminal, the method comprising:
  estimating uplink channel powers of utilized antenna beams;
  comparing the uplink channel powers of the antenna beams to each other;
  estimating a reception signal quality measure for the mobile terminal;
  comparing the estimated reception signal quality measure to at least one threshold value; and
  selecting a spatial transmission mode for a next downlink frame to the mobile terminal by utilizing at least one of the comparison results.

Also the objects of the invention are achieved by providing a base station which comprises a transceiver, a beamformer, a multi-antenna array and a processor unit, which is configured to:
  estimate uplink channel powers of utilized antenna beams;
  compare the uplink channel powers of the antenna beams to each other;
  estimate a reception signal quality measure for a mobile terminal;
  compare the estimated reception signal quality measure to at least one threshold value; and
  select a spatial transmission mode for a next downlink frame to the mobile terminal by utilizing at least one of the comparison results.

Also the objects of the present invention for selecting a spatial transmission mode are fulfilled by providing computer program product comprising:
  computer readable code for estimating uplink channel powers of utilized antenna beams;
  computer readable code for comparing the channel powers of the antenna beams to each other;
  computer readable code for estimating a reception signal quality measure for the mobile terminal;
  computer readable code for comparing the estimated reception signal quality measure to at least threshold value; and
  computer readable code for selecting a spatial transmission mode for a downlink frame to the mobile terminal by utilizing the comparison results.

The invention has the advantage that it is applicable directly to existing telecommunication systems, for example WiMAX according to standard IEEE 802.16e or UMTS.

Another advantage of the invention is that it allows a base station transmission mode to be changed and adapted to instantaneous radio channel conditions in a simple and robust way without relaying on beamforming weights fed back by the mobile terminal.

Another advantage of the invention is that it supports several antenna diversity techniques such as beamforming (BF), space-time coding (STC) and MIMO in downlink transmissions.

Another advantage of the invention is that it can be implemented by a simple software application in a prior art base station without the need for extensive modifications in the digital signal processing software.

Another advantage of the invention is that the beamforming gain is utilized for increasing power efficiency at the base station up to 6 dB with 4 TX antennas.

Another advantage of the invention is that it is applicable to a base station with variable number of antennas, e.g. 2-8 antennas.

Another advantage of the invention is that it can also take into account in switching between STC and MIMO the signal-to-interference-and-noise ratio (SINR) at a mobile station and spatial correlation at base station antennas.

Another advantage of the invention is that the implementation of the inventive method is straightforward and robust and does not need a special beamforming support from the mobile terminal. Thus it does not increase the complexity of the mobile terminal as the advanced precoding techniques do.

In avoiding excessive feedback the inventive method supports high mobility and improves the reliability of the utilized radio link.

A further advantage of the invention is that the SINR level of the mobile terminal can be estimated from the uplink power properties measured by the base station. In that case the feedback delays can be fully avoided. This is possible due to the fact that the uplink and downlink are reciprocal in a power sense.

Some advantageous embodiments of the invention are presented in the dependent claims.

The inventive method is based on MIMO/transmit diversity which can utilize a fixed beam approach at a base station. An uplink (UL) power of each beam for each user is first measured in the baseband at the base station. This can be advantageously achieved since pilot channel based estimation is performed in any case for each of the uplink beams. If significant uplink power for a targeted user is measured only in one of the uplink beams, then this beam is advantageously applied in the next downlink (DL) transmission without employing MIMO or transmit diversity techniques. This corresponds to conventional beamforming.

If measurements on the base station baseband imply that the uplink power of the targeted user is significant in more than one beam then two or more fixed beams can advantageously be employed in the next down link transmission. In WiMAX case this means that either Matrix A (STC) or Matrix B/C (MIMO) can be utilized. The selection between Matrix A and Matrix B/C in WiMAX can advantageously be made based on an estimated signal-to-interference-and-noise ratio (SINR) at the mobile terminal. This information is obtained in a standard way by feedback from the mobile terminal.

Thus if the detected SINR is below a specified threshold and the uplink signal is detected from two or more beams then the STC transmission form is advantageously chosen.

If the detected SINR is above the specific threshold MIMO is advantageously applied.

Further scope of applicability of the present invention will become apparent from the detailed description given hereafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION

In the following the invention will be described using a two-antenna WiMAX base station as an example. However, it will be appreciated that the invention is not limited to the exemplary two antenna WiMAX system. The inventive method can be extended readily also for example to 4×4 or 8×8 STC/MIMO systems of any future wireless communication system, e.g. IMT-A (International Mobile Telecommunication-Advanced) or 3GPP LTE.

Figure 1A:
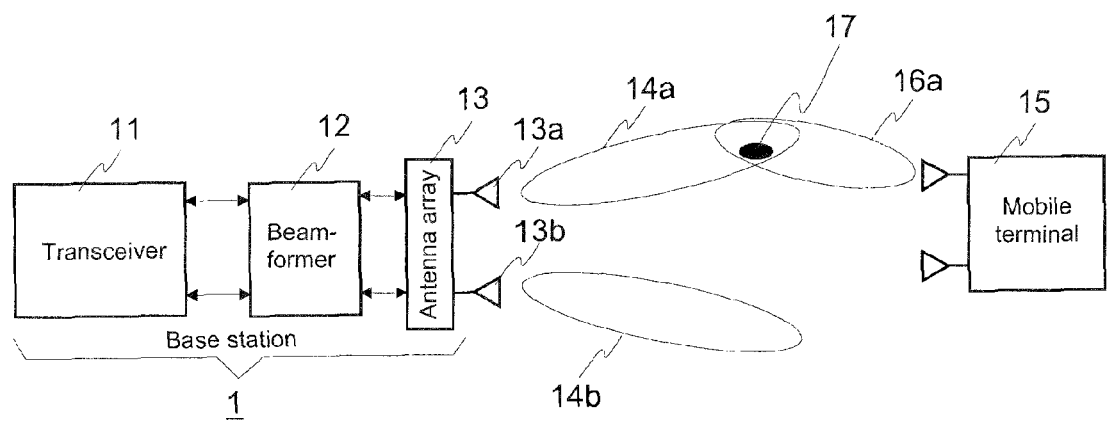
FIG. 1a shows an embodiment where beamforming can be utilized.
Figure 1B:
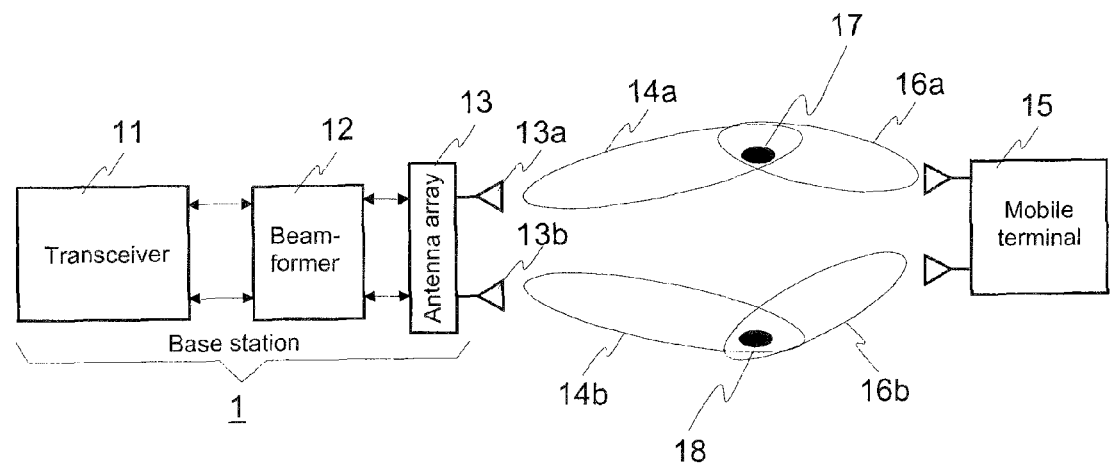
FIG. 1b shows an embodiment where space-time coding or MIMO can be utilized.

FIGS. 1a and 1b show a simplified example a transmission system where the selection method of a transmit diversity scheme according to the invention can be utilized. In the depicted example beamforming (BF), space-time coding (STC) or MIMO scheme can be utilized in the base station 1. Said three transmission modes are examples of spatial transmission modes.

Advantageously beamforming is implemented by fixed beams at the exemplary base station 1. In FIGS. 1a and 1b is depicted a base station 1 comprising a transceiver 11 comprising a transmitter and a receiver. The base station 1 comprises also a beamformer 12 and an antenna array 13 comprising two exemplary antennas 13a and 13b. The depicted exemplary beamformer 12 can generate two depicted fixed beams 14a and 14b. The depicted base station 1 comprises also a proper processor unit for controlling the functions of the base station 1 (not shown in FIG. 1a or FIG. 1b).

In the fixed beam technique directions and widths of the two exemplary antenna beams 14a and 14b are set beforehand by phase differences and amplitude weights of the beamformer 12. The beamformer 12 can be implemented for example using analog delay lines.

One known way to implement a beamformer by phase angle differences is to utilize a Butler-matrix. An M×M Butler-matrix can create M spatially orthogonal beams by using M antennas. An abbreviation M equals $2^n$ and where n=1, 2, 3, etc. The Butler matrix can be advantageously integrated in a remote radio head (RRH) or in the antenna array 13 of the base station 1.

Another known way to implement a beamformer by phase angle differences is to define the number of beams and the corresponding phase shifts in a way that the desired beam set is obtained. The number of beams can also be different from the number of antennas.

In the following a maximum ratio combining (MRC) receiver with two receiver antennas 13a and 13b are depicted in two alternative cases.

FIG. 1a depicts an embodiment of the invention where a beamformer with two exemplary fixed beams is utilized. Advantageously the depicted two fixed beams are created using a 2×2 Butler-matrix.

FIG. 1a shows a case in which signals from the desired mobile terminal 15 arrive at the base station antennas 13a and 13b from only an upper half-sector. The mobile terminal 15 comprises one, two or several antennas.

In a typical 3-sector case with 120-degree sectors the half-sector corresponds to 60 degrees. In FIG. 1a the uplink signals from the mobile terminal 15 are scattered from an obstacle 17 in the upper half-sector. The uplink pilot signals have significant level only in one beam 14a covering the upper half-sector. Signal level received from the second beam 14b is negligible.

Since the signals from the two depicted antenna branches 13a and 13b are combined in uplink using maximum ratio combining the receiver unit 11 knows exactly the amplitude and power of the pilot signals in the two depicted beams 14a and 14b. If the uplink pilot power is significant only in one beam 14a, as in the case in FIG. 1a, the next downlink frame is advantageously transmitted via that beam 14a. This corresponds to standard beamforming by switched beams (BF) and with two antennas a beamforming gain of up to 3 dB can be obtained.

FIG. 1b depicts an embodiment of the invention where space-time coding (STC) or MIMO beams can be utilized. The exemplary antenna array 13 comprises two antennas 13a and 13b.

FIG. 1b shows a case in which signals from the desired mobile terminal 15 arrive at the base station antenna array 13 from the entire sector. In this case the uplink pilot signals have significant power level in both depicted beams 14a and 14b. In the example of FIG. 1b uplink signals from the mobile terminal 15 are scattered from two obstacles 17 and 18. Situation depicted in FIG. 1b may occur for example with large angular spreading of the signals which is typical in micro cell deployment and in indoors.

Same kind of situation may also occur with small angular spreading if the mobile terminal 15 is located in the middle of the sector at the beam cross-over.

Since the signals from the mobile terminal 15 arrive from the two depicted beams 14a and 14b it is advantageous to apply space-time coding or MIMO over the two beams. In case of a low signal-to-interference-and-noise ratio (SINR) at the mobile terminal 15, which denotes large path loss between the base station 1 and mobile terminal 15, the diversity approach by space-time coding (STC) is advantageous.

In another case where the signal-to-interference-and-noise ratio (SINR) level is high enough it is advantageous to employ true MIMO by transmitting different data streams via the two depicted beams 14a and 14b if the mobile terminal 15 has at least two antennas.

A criterion for selecting between beamforming (BF) and space-time coding (STC)/MIMO is advantageously based on a first predetermined threshold. Empirical studies have shown that significant diversity effect can be obtained if the two diversity branches do not have a larger difference in power levels than e.g. 10-15 dB. Therefore, 10-15 dB difference in the measured power levels could advantageously be used as the first threshold value.

A criterion for selecting between space-time coding (STC) and MIMO is advantageously based on a second predetermined threshold. The required signal-to-interference-and-noise ratio level (SINR) for the MIMO application depends on utilized modulation and coding scheme and the receiver algorithm. It is known in the art that the required SINR threshold at the mobile terminal could be in the range of 20-25 dB, for example. Therefore, 20-25 dB difference in the SINR value could advantageously be used as the second threshold value.

Instead of the above mentioned SINR also other measures depicting quality of a communication channel can advantageously be utilized. Some examples are SNR (Signal-to-Noise Ratio), CINR (Carrier to-Interference-plus-Noise Ratio) and RSSI (Received Signal Strength Indicator). A combination of at least two of the above-mentioned measures is also possible.

Figure 2:
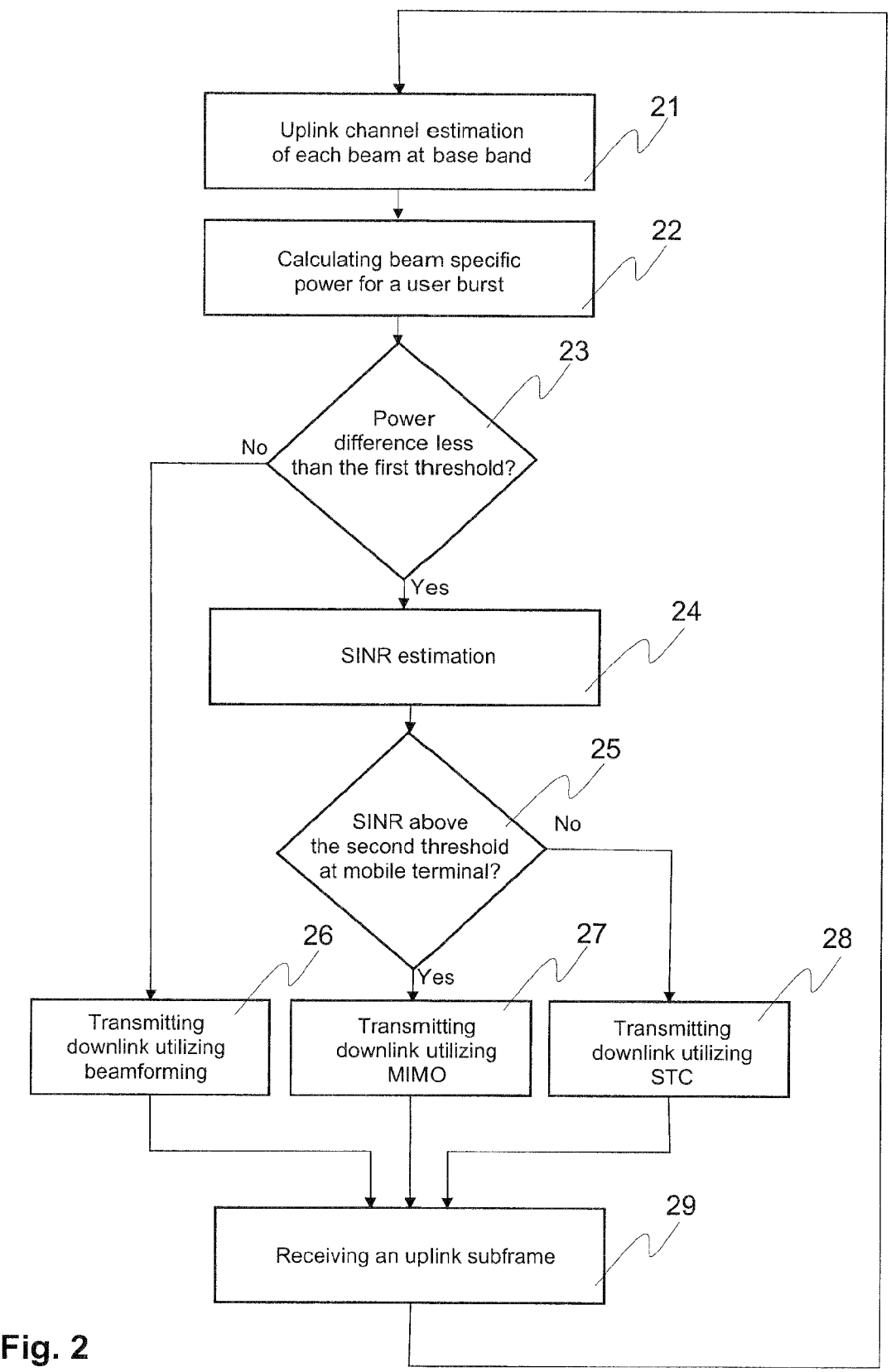
FIG. 2 shows, as an exemplary flow chart the main steps of selecting a proper downlink transmission mode for the next downlink transmission of the first embodiment.

FIG. 2 shows the main steps of the first embodiment of the procedure according to the invention as an exemplary flow chart. An uplink power of each receiver beam for each user is advantageously first measured in the baseband at the base station. This can be advantageously achieved by pilot channel based estimation. In another embodiment also the uplink user data is utilized in the channel power measurements.

In the explanation the two-antenna WiMAX base station system 1 depicted in FIGS. 1a and 1b is used also as a reference. As an exemplary quality measure of the communication channel in the flow charts of FIGS. 2 and 3 SINR has been used.

The process starts in step 21 where the base station 1 estimates channel impulse responses for both fixed beams 14a and 14b. Impulse responses are estimated from the received pilot subcarriers of an uplink subframe originating from a particular mobile terminal 15. The baseband processing is done in prior art base station 1 separately for each mobile terminal 15 in order to combine the uplink signals from the two beams 14a and 14b.

In an exemplary two beam base station 1 two vectors can be obtained, $h_{beam1}$ from beam 14a and $h_{beam2}$ from beam 14b, which vectors include the channel impulse responses for each of the pilot subcarriers in the received user burst.

Then the powers of the vectors $h_{beam1}$ and $h_{beam2}$ are calculated in step 22. It is also possible to include the data subcarriers in the power calculation since the data is anyway decoded in the baseband processing.

After calculating the powers of $h_{beam1}$ and $h_{beam2}$ the calculated values are compared to each other. If the power difference is larger than a first predefined threshold only the beam with larger power is employed in downlink transmission, step 26. Thus the base station 1 operates in beamforming mode during the next downlink transmission and it achieves the beamforming gain. The first threshold value can be in the range of 6-15 dB. Advantageously it could be about 10 dB.

If the measured power difference in step 23 is below the first predetermined threshold then signal-to-interference-and-noise ratio level measurement can be applied in step 24.

A choice made in step 25 between STC and MIMO is advantageously based on the signal-to-interference-and-noise ratio (SINR) at the mobile terminal. It can be either actually measured at the mobile terminal 15 or estimated in the utilized cellular network. A second threshold is applied in making the choice. An optimal value of the second threshold depends on the modulation and coding scheme utilized in the connection. The second threshold value may be for example in the range of 20-25 dB.

A basic rule utilized in the invention is that if averaged SINR is below a second threshold then STC is applied in step 28.

If the averaged SINR is above the second threshold then MIMO is applied in step 27.

In one advantageous embodiment the WiMAX base station 1 can obtain SINR info through a feedback channel from the mobile terminal 15. The SINR info can be either averaged or data stream specific.

In another advantageous embodiment the SINR level of the mobile terminal 15 is advantageously estimated from the uplink at the base station 1. This is possible because in the power sense the uplink and downlink are reciprocal. In the estimation also information about the power control, automatic gain control and the mobile terminal distance and position could be used. In case of uplink SINR estimation the delays related to mobile terminal SINR reporting and the corresponding control signaling overhead can be avoided. Therefore, the invention can be applied also with high mobile terminal 15 velocities.

When the downlink transmission 26, 27 or 28 ends then in step 29 the base station 1 receives next uplink transmission from the mobile terminals 15. After that the process returns to step 21 and the process is repeated.

Figure 3:
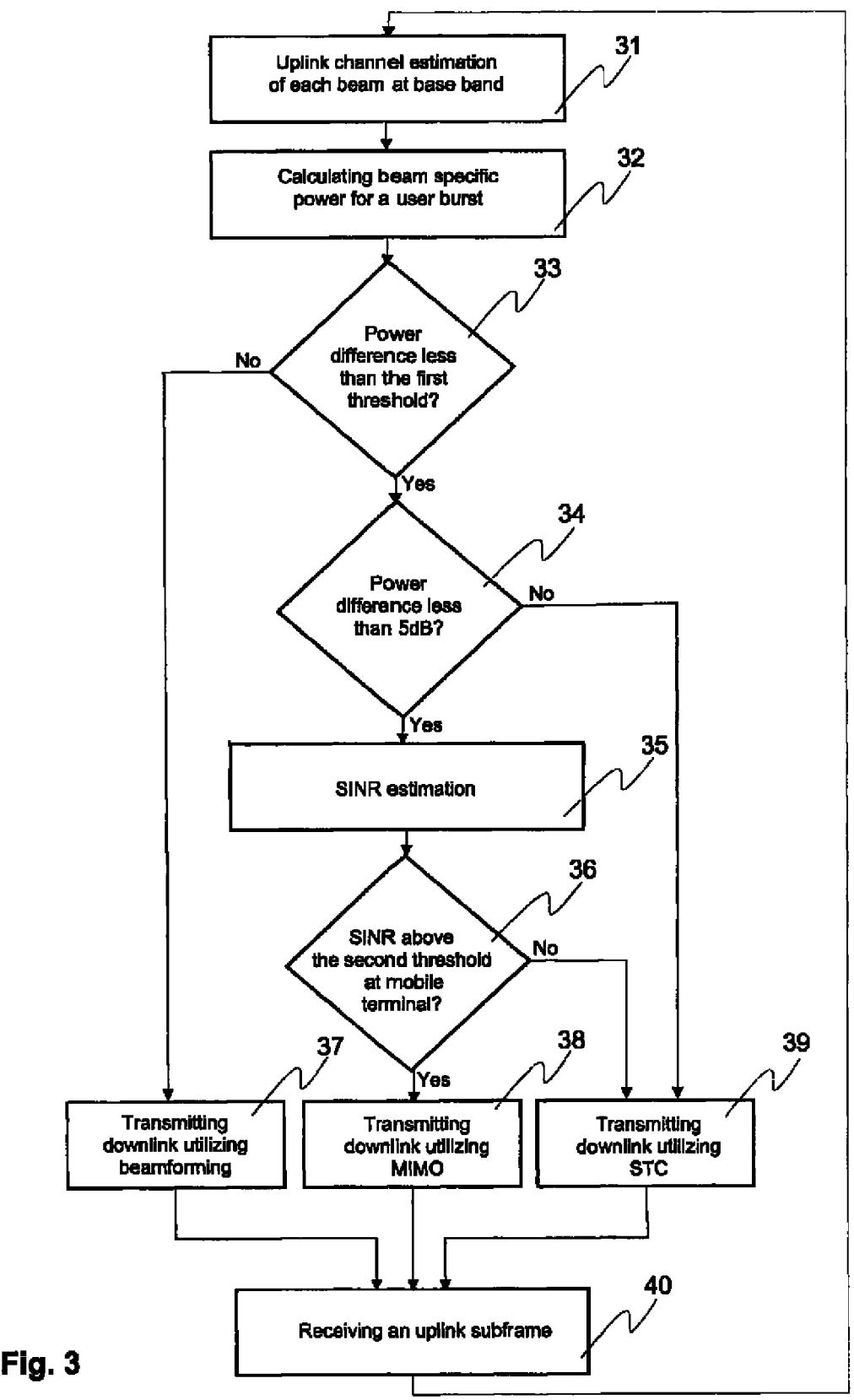
FIG. 3 shows, as an exemplary flow chart the main steps of selecting a proper downlink transmission mode for the next downlink transmission of the second embodiment.

FIG. 3 shows the main steps of a second embodiment of the procedure according to the invention as an exemplary flow chart. In the explanation the two-antenna base station system depicted in FIGS. 1a and 1b is used as a reference.

The process starts in step 31 where the base station 1 estimates channel impulse responses from the received pilot subcarriers of the uplink subframe. The baseband processing is done in prior art base station 1 separately for each of the mobile terminals 15 in order to combine the uplink signals from the two beams 14a and 14b.

In an exemplary two beam base station 1 two vectors, $h_{beam1}$ and $h_{beam2}$, can be obtained which vectors include the channel impulse responses for each of the pilot subcarriers in the allocated user burst.

Then the powers of the vectors are calculated in step 32. It is also possible to include the data subcarriers in the power calculation since the data is anyway decoded in the baseband processing.

After calculating the powers of $h_{beam1}$ and $h_{beam2}$ the calculated values are compared to each other. If the power difference is larger than a first predefined threshold only the beam with larger power is employed in downlink transmission, step 37. Thus the base station 1 operates in beamforming mode during the next downlink transmission and it achieves the beamforming gain. The first threshold value can be in the range of 6-15 dB. Advantageously it could be set at 10 dB.

If the measured power difference in step 33 is below the first predetermined threshold then in step 34 is further compared if the power difference is above or under 5 dB. If the power difference is above 5 dB but under the first threshold then STC is utilized in the next downlink, step 39.

Since MIMO transmission includes the same modulation and coding scheme the power difference between $h_{beam1}$ and $h_{beam2}$ should be rather small. Thus a second power difference threshold could be applied to MIMO in step 34. For example, if the power difference is between 5 dB and the first threshold STC is applied regardless of the SINR. Then, MIMO is applied only if the power difference is below 5 dB and SINR is larger than the second predefined threshold.

If the power difference is below 5 dB then signal-to-interference-and-noise ratio level measurement is applied in step 35.

A further choice made in step 36 between STC and MIMO is advantageously based on the measured SINR. A second predetermined threshold is applied in making the choice. An optimal value of the second threshold depends on the modulation and coding scheme utilized in the connection. The second threshold value may be for example 23 dB.

A basic rule utilized in the invention is that if averaged SINR is below the second threshold then STC is applied in step 39.

If the averaged SINR is above the second threshold then MIMO is applied in step 38.

Also in the second advantageous embodiment the WiMAX base station 1 can obtain SINR info through a feedback channel from the mobile terminal 15. The SINR info can be either averaged or data stream specific.

In an alternative embodiment the SINR level of the mobile terminal 15 is advantageously estimated from the uplink at the base station 1. This is possible because in the power sense the uplink and downlink are reciprocal. In the estimation also information about the power control, automatic gain control and the mobile terminal distance and position could be used. If uplink SINR estimation is applied then the delays related to mobile terminal SINR reporting and the corresponding control signaling overhead could be avoided. Therefore, the invention can be applied also with high mobile terminal 15 velocities.

When the downlink transmission 37, 38 or 39 ends then in step 40 the base station 1 receives next uplink transmission from the mobile terminals 15. After that the process returns to step 31 and the process is repeated.

Essential method steps depicted in FIGS. 2 and 3 can advantageously be performed by utilizing a proper software application in the base station 1. The software is advantageously saved in a memory unit included in the base station hardware. For fulfilling the invention said software can be executed in a proper processor unit included in the base station hardware. Depicted calculations and comparisons in FIGS. 2 and 3 are advantageously executed utilizing said software. Based on the comparison results the processor unit advantageously instructs the transmitter of the base station 1 to utilize a most suitable diversity transmission mode, i.e. beamforming, STC or MIMO when a downlink transmission is due.

The invention being thus described, it will be obvious that the same may be varied in many ways. For example, the method can be extended readily also e.g. to 4×4 or 8×8 STC/MIMO cases. Such variations are not to be regarded as a departure from the spirit and scope of the invention, and all such modifications as would be obvious to one skilled in the art are intended to be included within the scope of the following claims.

The invention claimed is:

1. A method for selecting a downlink spatial transmission mode from a multi-antenna base station to a mobile terminal, the method comprising:
    estimating uplink channel powers of utilized antenna beams;
    comparing the uplink channel powers of the antenna beams to each other;
    estimating a reception signal quality measure for the mobile terminal;
    comparing the estimated reception signal quality measure to at least one threshold value; and
    selecting a spatial transmission mode for a next downlink frame to the mobile terminal by utilizing at least one of the comparison results,
    wherein the selected downlink spatial transmission mode is one of the following: beamforming (BF), space-time coding (STC) and multiple input multiple output scheme (MIMO), where beamforming (BF) is selected when the calculated uplink channel powers differ from each other more than a first threshold value.

2. The method according to claim 1, wherein estimation of the channel uplink powers comprises:
    estimating in the base station at base band uplink channel impulse responses of the utilized antenna beams; and
    calculating uplink channel powers of the antenna beams by utilizing the estimated uplink channel impulse responses.

3. The method according to claim 1, wherein a value of the reception quality measure is feedback information of the mobile terminal.

4. The method according to claim 1, wherein a value of the reception quality measure is an uplink signal measurement at the base station.

5. A base station comprising:
    a transceiver;
    a beamformer;
    a multi-antenna array; and
    a processor unit which is configured to:
        estimate uplink channel powers of utilized antenna beams;
        compare the uplink channel powers of the antenna beams to each other;
        estimate a reception signal quality measure for a mobile terminal;
        compare the estimated reception signal quality measure to at least one threshold value; and
        select a spatial transmission mode for a next downlink frame to the mobile terminal by utilizing at least one of the comparison results from the following spatial transmission modes: beamforming (BF), space-time coding (STC) and multiple input multiple output scheme (MIMO), and to select beamforming (BF) when the calculated uplink channel powers differs from each other more than a first threshold value.

6. The base station according to claim 5, wherein for estimating the uplink channel powers the processor unit is configured to:
estimate at base band uplink channel impulse responses of the utilized antenna beams; and
calculate uplink channel powers of the antenna beams by utilizing the estimated uplink channel impulse responses.

7. The base station according to claim 6, wherein the processor unit is configured to obtain the second quality measure from feedback information of a mobile terminal.

8. The base station according to claim 6, wherein the processor unit is configured to estimate the second quality measure at a mobile terminal by uplink power level measurements at the base station.

9. The base station according to claim 5, wherein the base station is one of the following: a WiMAX base station, an UMTS base station and a 3GPP LTE base station.

10. A non-transitory computer readable medium encoded with software readable by a data processing device for selecting a spatial transmission mode comprising:
computer readable code for estimating uplink channel powers of utilized antenna beams;
computer readable code for comparing the channel powers of the antenna beams to each other;
computer readable code for estimating a reception signal quality measure for the mobile terminal;
computer readable code for comparing the estimated reception signal quality measure to at least one threshold value; and
computer readable code for selecting a spatial transmission mode for a downlink frame to the mobile terminal by utilizing the comparison results,
wherein the selected downlink spatial transmission mode is one of the following: beamforming (BF), space-time coding (STC) and multiple input multiple output scheme (MIMO), and selecting beamforming (BF) when the calculated uplink channel powers differs from each other more than a first threshold value.

11. The non-transitory computer readable medium according to claim 10, comprising for estimating the uplink channel powers:
computer readable code for estimating channel impulse responses of utilized antenna beams utilizing an uplink subframe from a mobile terminal; and
computer readable code for calculating uplink channel powers of the received antenna beams by utilizing the estimated channel impulse responses.

12. The non-transitory computer readable medium according to claim 10 comprising computer readable code for obtaining the second quality measure from feedback information of a mobile terminal.

13. The non-transitory computer readable medium according to claim 10 comprising computer readable code for estimating a value of the reception quality measure of the mobile station utilizing an uplink signal measurement.

14. A method for selecting a downlink spatial transmission mode from a multi-antenna base station to a mobile terminal, the method comprising:
estimating uplink channel powers of utilized antenna beams;
comparing the uplink channel powers of the antenna beams to each other;
estimating a reception signal quality measure for the mobile terminal;
comparing the estimated reception signal quality measure to at least one thresh-old value; and
selecting a spatial transmission mode for a next downlink frame to the mobile terminal by utilizing at least one of the comparison results, wherein the selected downlink spatial transmission mode is one of the following: beamforming (BF), space-time coding (STC) and multiple input multiple output scheme (MIMO), where space-time coding (STC) is selected when the calculated uplink channel powers differs from each other less than a first threshold value but the channel power difference is more than 5 dB.

15. A method for selecting a downlink spatial transmission mode from a multi-antenna base station to a mobile terminal, the method comprising:
estimating uplink channel powers of utilized antenna beams;
comparing the uplink channel powers of the antenna beams to each other;
estimating a reception signal quality measure for the mobile terminal where the reception signal quality measure is at least one of the following: Signal-to-Interference-and-Noise Ratio (SINR), Signal-to-Noise Ratio (SNR), Carrier to-Interference-plus Noise Ratio (CINR) and Received Signal Strength Indicator (RSSI);
comparing the estimated reception signal quality measure to at least one threshold value; and
selecting a spatial transmission mode for a next downlink frame to the mobile terminal by utilizing at least one of the comparison results, where space-time coding (STC) is selected when the calculated uplink channel powers differs from each other less than a first threshold value and when the reception signal quality measure is a signal-to-interference-and-noise ratio (SINR) and is below a second threshold value.

16. A method for selecting a downlink spatial transmission mode from a multi-antenna base station to a mobile terminal, the method comprising:
estimating uplink channel powers of utilized antenna beams;
comparing the uplink channel powers of the antenna beams to each other;
estimating a reception signal quality measure for the mobile terminal where the reception signal quality measure is at least one of the following: Signal-to-Interference-and-Noise Ratio (SINR), Signal-to-Noise Ratio (SNR), Carrier to-Interference-plus Noise Ratio (CINR) and Received Signal Strength Indicator (RSSI);
comparing the estimated reception signal quality measure to at least one threshold value; and
selecting a spatial transmission mode for a next downlink frame to the mobile terminal by utilizing at least one of the comparison results, where multiple input multiple output scheme (MIMO) is selected when the uplink calculated channel powers differs from each other less than a first threshold value and when the reception signal quality measure is a signal-to-interference-and-noise ratio (SINR) and is above a second threshold value.

17. A method for selecting a downlink spatial transmission mode from a multi-antenna base station to a mobile terminal, the method comprising:
estimating uplink channel powers of utilized antenna beams;

comparing the uplink channel powers of the antenna beams to each other;
estimating a reception signal quality measure for the mobile terminal where the reception signal quality measure is at least one of the following: Signal-to-Interference-and-Noise Ratio (SINR), Signal-to-Noise Ratio (SNR), Carrier to-Interference-plus Noise Ratio (CINR) and Received Signal Strength Indicator (RSSI);
comparing the estimated reception signal quality measure to at least one threshold value; and
selecting a spatial transmission mode for a next downlink frame to the mobile terminal by utilizing at least one of the comparison results, where multiple input multiple output scheme (MIMO) is selected when the calculated uplink channel powers differs from each other less than a first threshold and the channel power difference is less than 5 dB and when the reception signal quality measure is a signal-to-interference-and-noise ratio (SINR) and is above a second threshold value.

18. A base station comprising:
a transceiver;
a beamformer;
a multi-antenna array; and
a processor unit which is configured to:
estimate uplink channel powers of utilized antenna beams;
compare the uplink channel powers of the antenna beams to each other;
estimate a reception signal quality measure for a mobile terminal, wherein the reception signal quality measure is at least one of the following: Signal-to-Interference-and-Noise Ratio (SINR), Signal-to-Noise Ratio (SNR), Carrier to-Interference-plus Noise Ratio (CINR) and Received Signal Strength Indicator (RSSI);
compare the estimated reception signal quality measure to at least one threshold value; and
select a spatial transmission mode for a next downlink frame to the mobile terminal by utilizing at least one of the comparison results from the following spatial transmission modes: beamforming (BF), space-time coding (STC) and multiple input multiple output scheme (MIMO), and to select space-time coding (STC) when the calculated uplink channel powers differs from each other less than a first threshold value and when the reception signal quality measure is a signal-to-interference-and-noise ratio (SINR) and is below a second threshold value.

19. A base station comprising:
a transceiver;
a beamformer;
a multi-antenna array; and
a processor unit which is configured to:
estimate uplink channel powers of utilized antenna beams;
compare the uplink channel powers of the antenna beams to each other;
estimate a reception signal quality measure for a mobile terminal, wherein the reception signal quality measure is at least one of the following: Signal-to-Interference-and-Noise Ratio (SINR), Signal-to-Noise Ratio (SNR), Carrier to-Interference-plus Noise Ratio (CINR) and Received Signal Strength Indicator (RSSI);
compare the estimated reception signal quality measure to at least one threshold value; and
select a spatial transmission mode for a next downlink frame to the mobile terminal by utilizing at least one of the comparison results from the following spatial transmission modes: beamforming (BF), space-time coding (STC) and multiple input multiple output scheme (MIMO), and to select multiple input multiple output scheme (MIMO) when the calculated uplink channel powers differ from each other less than a first threshold value and when the reception signal quality measure is a signal-to-interference-and-noise ratio (SINR) and is above a second threshold value.

20. A base station comprising:
a transceiver;
a beamformer;
a multi-antenna array; and
a processor unit which is configured to:
estimate uplink channel powers of utilized antenna beams;
compare the uplink channel powers of the antenna beams to each other;
estimate a reception signal quality measure for a mobile terminal, wherein the reception signal quality measure is at least one of the following: Signal-to-Interference-and-Noise Ratio (SINR), Signal-to-Noise Ratio (SNR), Carrier to-Interference-plus Noise Ratio (CINR) and Received Signal Strength Indicator (RSSI);
compare the estimated reception signal quality measure to at least one threshold value; and
select a spatial transmission mode for a next downlink frame to the mobile terminal by utilizing at least one of the comparison results from the following spatial transmission modes: beamforming (BF), space-time coding (STC) and multiple input multiple output scheme (MIMO), and to select space-time coding (STC) when the calculated uplink channel powers differs from each other less than a first threshold value but the channel power difference is more than 5 dB.

21. A base station comprising:
a transceiver;
a beamformer;
a multi-antenna array; and
a processor unit which is configured to:
estimate uplink channel powers of utilized antenna beams;
compare the uplink channel powers of the antenna beams to each other;
estimate a reception signal quality measure for a mobile terminal, wherein the reception signal quality measure is at least one of the following: Signal-to-Interference-and-Noise Ratio (SINR), Signal-to-Noise Ratio (SNR), Carrier to-Interference-plus Noise Ratio (CINR) and Received Signal Strength Indicator (RSSI);
compare the estimated reception signal quality measure to at least one threshold value; and
select a spatial transmission mode for a next downlink frame to the mobile terminal by utilizing at least one of the comparison results from the following spatial transmission modes: beamforming (BF), space-time coding (STC) and multiple input multiple output scheme (MIMO), and to select multiple input multiple output scheme (MIMO) when the calculated uplink channel powers differs from each other less than a first threshold and the channel power difference is less than 5 dB and when the reception signal quality measure is a signal-to-interference-and-noise ratio (SINR) and is above a second threshold value.

* * * * *